United States Patent
Fukuda et al.

(10) Patent No.: US 6,945,078 B2
(45) Date of Patent: Sep. 20, 2005

(54) OPTICAL WAVEGUIDE IN THE INTERIOR OF SILICA GLASS AND METHOD OF FORMING OPTICAL WAVEGUIDE

(75) Inventors: Takeshi Fukuda, Sakura (JP); Shimon Ishikawa, Sakura (JP); Tomoko Fujii, Sakura (JP); Ken Sakuma, Sakura (JP); Hideyuki Hosoya, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/644,827

(22) Filed: Aug. 21, 2003

(65) Prior Publication Data

US 2004/0047578 A1 Mar. 11, 2004

(30) Foreign Application Priority Data

Aug. 27, 2002 (JP) ..................... P2002-247403
Feb. 7, 2003 (JP) ..................... P2003-030816
Jul. 9, 2003 (JP) ..................... P2003-194274

(51) Int. Cl.$^7$ .................... C02B 37/023; C02B 37/022; G02B 6/10
(52) U.S. Cl. .................... 65/386; 65/385; 385/129; 385/132
(58) Field of Search ................. 385/129–132, 385/123, 125; 372/18, 25; 438/29, 31–32; 65/376, 385–386, 387, 393

(56) References Cited

U.S. PATENT DOCUMENTS

| | | | | |
|---|---|---|---|---|
| 5,786,560 A | * | 7/1998 | Tatah et al. | 219/121.77 |
| 6,154,593 A | * | 11/2000 | Miura et al. | 385/123 |
| 6,442,313 B2 | * | 8/2002 | Yamauchi et al. | 385/37 |
| 6,573,026 B1 | * | 6/2003 | Aitken et al. | 430/290 |
| 6,628,877 B2 | * | 9/2003 | Dugan et al. | 385/129 |
| 6,633,419 B2 | * | 10/2003 | Hosono et al. | 359/35 |
| 6,729,161 B1 | * | 5/2004 | Miura et al. | 65/390 |
| 6,768,850 B2 | * | 7/2004 | Dugan et al. | 385/124 |
| 2002/0076655 A1 | | 6/2002 | Borrelli et al. | 430/321 |
| 2002/0167013 A1 | * | 11/2002 | Iwasaki et al. | 257/79 |
| 2003/0035640 A1 | * | 2/2003 | Dugan et al. | 385/124 |

FOREIGN PATENT DOCUMENTS

| | | |
|---|---|---|
| JP | 9-311237 | 12/1997 |
| JP | 2001-350049 A | 12/2001 |

OTHER PUBLICATIONS

Corning Incorporated, "HPFS Fused Silica KrF Grade", Corning Incorporated, Product Specifications, Sep. 30, 2003, http://www.corning.com/semiconductoroptics/products_services/pdf/h0607_hpfskrf_productsheet.pdf. is the specification of the silica ma.

(Continued)

Primary Examiner—Frank G. Font
Assistant Examiner—Ryan Lepisto
(74) Attorney, Agent, or Firm—Sughrue Mion, PLLC

(57) ABSTRACT

When an optical waveguide is formed by focused femtosecond laser pulses in a pure silica glass to induce a refractive index increase region, a pulse width of femtosecond laser pulses are changed, a peak power of femtosecond laser pulses at the focal point is changed, or both the pulse width and the peak power are changed simultaneously. Under conditions where a pulse width of the femtosecond laser pulses is in a range of 210 to 420 fs and a peak power at the focal point is not greater than $8.7 \times 10^{11}$ W/cm$^2$, an optical waveguide having a mode field of 10 to 14 μm such that an aspect ratio is 1 (one) can be obtained. By doing this, it is possible to control a mode field diameter of an optical waveguide and an aspect ratio of the mode field diameter.

11 Claims, 4 Drawing Sheets

OTHER PUBLICATIONS

T. Fukuda et al., "Writing Waveguides in Pure Silica Glass by Femtosecond Laser Pulses", The Japan Society of Applied Physics, 63$^{rd}$ Annual Meeting, 27p–YB–5, Sep. 2002.

S. Ishikawa et al. "Writing Waveguides in Pure Silica Glass by Femtosecond Laser Pulses" The Institute of Electronics, Information and Communication Engineers, Society Conference, 2002. 9.

Matthias Will et al., "Optical properties of waveguides fabricated in fused silica by femtosecond laser pulses", Applied Optics, vol. 41, No. 21, Jun. 20, 2002, pp. 4360–4364.

* cited by examiner

OPTICAL WAVEGUIDE IN THE INTERIOR OF SILICA GLASS AND METHOD OF FORMING OPTICAL WAVEGUIDE

BACKGROUND OF THE INVENTION

Priority is claimed under 35 U.S.C. § 119 to Japanese patent application nos. 2002-247403 filed Aug. 27, 2002, 2003-030816 filed Feb. 7, 2003 and 2003-194274 filed Jul. 9, 2003, all of which are incorporated herein by reference.

1. Field of the Invention

The present invention relates to a method for forming an optical waveguide in a transparent material such as a pure silica glass by focused femtosecond laser pulses. Also, the present invention relates to an optical waveguide which is formed according to the above method.

2. Description of Related Art

According to a method for forming an optical waveguide by focused femtosecond laser pulses, there is a phenomenon in which a refractive index increases near a focal point when high intensity femtosecond laser pulses are focused in various transparent materials such as a pure silica glass. By utilizing such a phenomenon, it is possible to form a refractive index change and a linear shape of refractive index increase region such as an optical waveguide by focused femtosecond laser pulses in a transparent material and scanning femtosecond laser pulses or the transparent material (See Japanese Unexamined Patent Application, First Publication No Hei 9-311237).

When forming such an optical waveguide according to this forming method, the induced refractive index distribution to be changed is determined according to various process conditions such as "average output power", "pulse width", "repetition rate", "center wavelength" in femtosecond laser pulses which are focused, and other process conditions such as a numerical aperture of a microscope objective for focusing femtosecond laser pulses and a scanning speed of a precision stage.

Japanese Unexamined Patent Application, First Publication No 2001-350049, discloses that it is possible to change the refractive index distribution to be changed in an optical waveguide gradually by changing an average output power of femtosecond laser pulses which are focused so as to be synchronized with a movement of a precision stage on which a pure silica glass is mounted. As a result, it is possible to change a mode field diameter of an optical waveguide along with the average output power of femtosecond laser pulses which are changed. It is also possible to reduce a connection loss between an optical waveguide and an optical fiber.

Here, the intensity of the femtosecond laser pulses are not necessarily distributed circular at the focal point when femtosecond laser pulses are focused because of an influence of aberrations by a microscope objective. It is understood that a shape of refractive index increase region, which is induced, changes because of an intensity distribution of femtosecond laser pulses at the focal point. That is, it is understood that the refractive index distribution is not adequate when the intensity distribution of femtosecond laser pulses at the focal point does not become circular; thus the mode field of a guided light in an optical waveguide does not become circular.

Also, it is necessary to connect the optical waveguide. Usually, a refractive index distribution in an optical components such as an optical fiber is circular. Therefore, there is a problem in that a connection loss increases and a polarization mode dispersion and a polarization dependent loss increase unless a mode field in an optical waveguide is circular.

Furthermore, it is necessary that a mode field diameter of an optical waveguide and a mode field diameter of optical components, such as an optical fiber, are the same as each other or close to each other when an optical waveguide is connected to optical components such as an optical fiber. There is a problem in that a connection loss increases if a difference of the mode field diameter is large between them. It is possible to control the mode field diameter in an optical waveguide by changing an average output power of femtosecond laser pulses when an optical waveguide is formed by focused femtosecond laser pulses. It is reported, in a document "The Review of Laser Engineering, Miura et al., February Issue, pages 150 to 154", that a mode field diameter increases when an average output power of femtosecond laser pulses increases.

To obtain an optical waveguide having a 7 $\mu$m of mode field diameter, which is a mode field diameter commonly used for a single mode fiber, by focusing femtosecond laser pulses, it is necessary to increase an average output power of femtosecond laser pulses.

However, when an optical waveguide is formed by increasing an average output power of femtosecond laser pulses, the mode field does not become circular. That is, the mode field becomes elliptical which expands in a direction in which femtosecond laser pulses are focused. Thus, there is above problem.

An object of the present invention is to control a mode field diameter of an optical waveguide when an optical waveguide is formed in a transparent material by focused femtosecond laser pulses. Also, other object of the present invention is to control an aspect ratio of a mode field diameter. Yet, other object of the present invention is to control both a mode field diameter and the aspect ratio of the mode field diameter. Also, an object of the present invention is to form a mode field in a range of 10 to 14 $\mu$m and an aspect ratio is in a range of 0.9 to 1.1 by controlling such process conditions.

SUMMARY OF THE INVENTION

In order to solve the above problems, a method for forming an optical waveguide according to the present invention includes the steps of focusing femtosecond laser pulses in a pure silica glass to induce a refractive index increase region, changing a pulse width of femtosecond laser pulses, and controlling a mode field diameter of a guided light in the optical waveguide.

Also, a method for forming an optical waveguide according to the present invention is characterized in that the pulse width of femtosecond laser pulses is not greater than 420 fs.

Also, a method for forming an optical waveguide according to the present invention is characterized in that the pulse width of femtosecond laser pulses is in a range of 210 to 420 fs.

Also, a method for forming an optical waveguide according to the present invention includes the steps of focusing femtosecond laser pulses in a pure silica glass to induce a refractive index increase region, changing a peak power of femtosecond laser pulses at the focal point, and controlling an aspect ratio of a mode field diameter of a guided light in the optical waveguide.

Also, a method for forming an optical waveguide according to the present invention is characterized in that the peak power of femtosecond laser pulses at the focal point is not greater than $8.7 \times 10^{11}$ W/cm$^2$.

Also, a method for forming an optical waveguide according to the present invention includes the steps of focusing femtosecond laser pulse in a pure silica glass to induce a refractive index increase region, changing a pulse width of femtosecond laser pulse, changing a peak power of femtosecond laser pulse at the focal point, and controlling an aspect ratio of a mode field diameter of a guided light in the optical waveguide.

Also, a method for forming an optical waveguide according to the present invention is characterized in that the pulse width of femtosecond laser pulse is not greater than 490 fs, and the peak power of femtosecond laser pulse at the focal point is not greater than $8.7 \times 10^{11}$ W/cm$^2$.

Also, a method for forming an optical waveguide according to the present invention is characterized in that the pulse width of femtosecond laser pulse are greater than 420 fs, and the peak power of femtosecond laser pulse at the focal point is not greater than $8.7 \times 10^{11}$ W/cm$^2$.

Also, a method for forming an optical waveguide according to the present invention is characterized in that the pulse width of femtosecond laser pulse is in a range of 210 to 420 fs, and the peak power of femtosecond laser pulse at the focal point is not greater than $8.7 \times 10^{11}$ W/cm$^2$.

Also, the present invention is characterized in that an optical waveguide is formed according to the above methods.

Also, the present invention is characterized in that an optical waveguide is formed according to the above method, and a mode field diameter of the optical waveguide is 10 to 14 μm, and an aspect ratio of the mode field diameter is in a range of 0.9 to 1.1.

According to a method of the present invention for forming an optical waveguide, it is possible to change a pulse width of the femtosecond laser pulse and control a mode field diameter of an optical waveguide which is formed.

Also, it is possible to change a peak power of the femtosecond laser pulse at the focal point and control an aspect ratio of a mode field diameter of an optical waveguide which is formed.

Furthermore, it is possible to change a pulse width of the femtosecond laser pulse and a peak power at the focal point simultaneously and control a mode field diameter of an optical wave guide, which is formed and an aspect ratio of an optical waveguide.

Also, according to an optical waveguide of the present invention, it is possible to form an optical waveguide in which either one or a both of a mode field diameter of an optical waveguide and an aspect ratio of the mode field diameter are controlled.

DETAILED DESCRIPTION OF THE INVENTION

A method for forming an optical waveguide according to the present invention is explained with reference to three embodiments as follows.

First Embodiment

Figure 1:
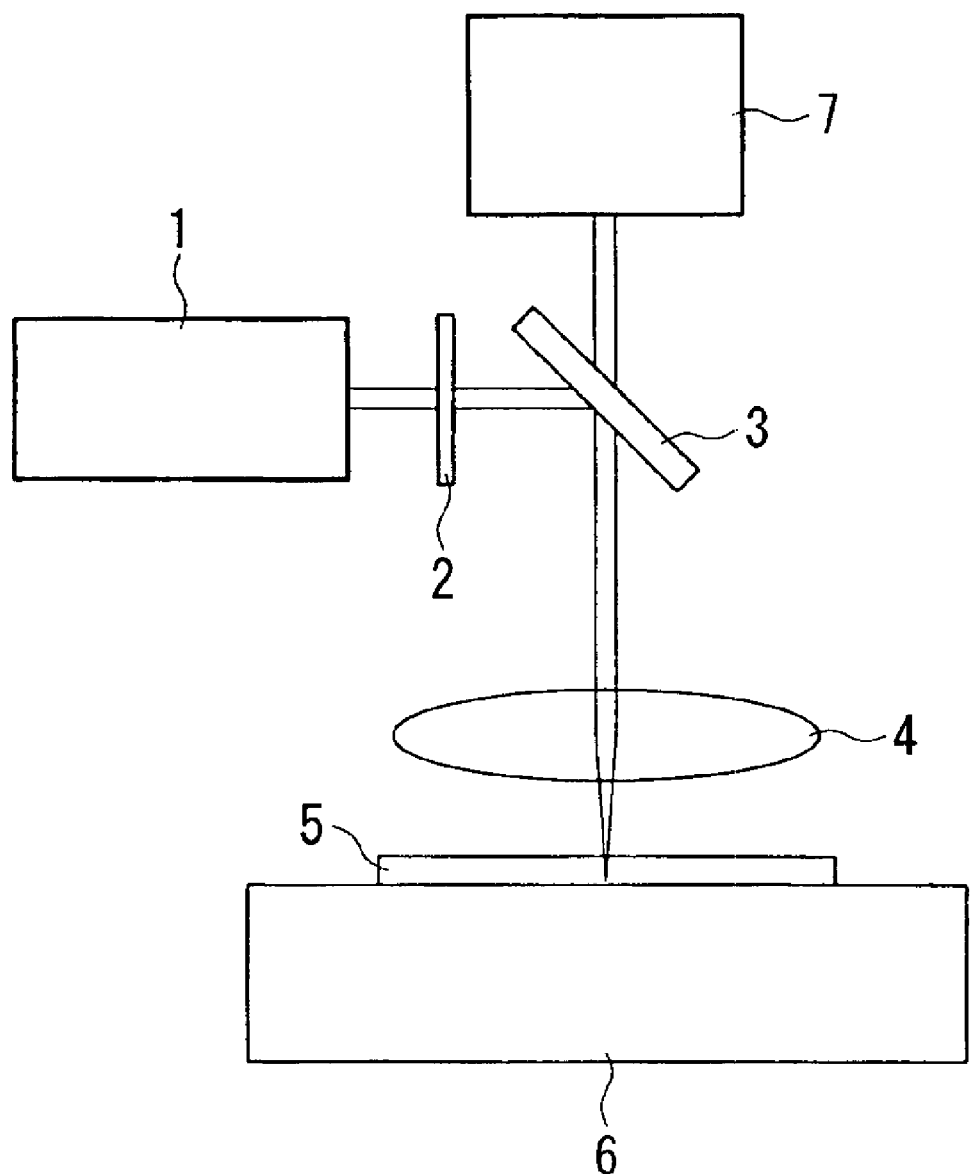
FIG. 1 is a view for an example of a general structure of a process machine which is used for a method for manufacturing an optical waveguide according to the present invention.

FIG. 1 shows an example for a processing machine by which a first embodiment of a method for forming an optical waveguide according to the present invention is performed. In the drawing, reference number 1 indicates a light source comprising femtosecond laser pulses. The light source comprising femtosecond laser pulses 1 oscillates femtosecond laser pulses having an 800 nm center wavelength, a 200 kHz repetition rate, and a 150 to 600 fs pulse width.

The output power of the femtosecond laser pulses which are irradiated from the light source comprising femtosecond laser pulses 1 is attenuated and adjusted via a neutral density filter (hereinafter called as an ND filter) 2. After the pulses pass through ND filter 2, the femtosecond laser pulses 1 are reflected on a mirror 3 and sent to a condenser 4.

The condenser 4 is a convex lens. Femtosecond laser pulses which are incident to the condenser 4 are focused here and irradiated to be incident to a pure silica glass plate 5. The pure silica glass plate 5 is fixed on a three-dimensional precision stage 6 such that the pure silica glass plate 5 can move in an X direction, Y direction, and Z direction.

Also, reference number 7 in the drawing indicates a video camera such as a CCD camera. The video camera 7 receives and takes a picture of the white light which is generated at the focal point in the pure silica glass plate 5 via the mirror 3 when femtosecond laser pulses are focused in the pure silica glass plate 5 so as to monitor a reaction status at the focal point.

When femtosecond laser pulses are focused in the pure silica glass plate 5 by using a processing machine shown in FIG. 1, a mode field diameter of an optical waveguide, which is formed in this embodiment, is controlled by changing the pulse width of the femtosecond laser pulses in the first embodiment.

According to a method for changing the pulse width of the femtosecond laser pulses, a pulse width is broadened before being narrowed by using a grating in a process for regenerative amplified femtosecond laser pulses in the light source comprising femtosecond laser pulses 1. In such a case, it is possible to change the pulse width by changing an angle and position of the grating to be used.

Also, it is possible to change the pulse width by introducing femtosecond laser pulses which are regeneratively amplified to a pair of prisms which are formed by a plurality of prisms and combining a group delay dispersion which is generated by an angle dispersion between the prisms and a group delay dispersion in the prisms (See the document "The Review of Laser Engineering," Miura et al., February Issue, pages 150 to 154 (1998)).

In such a way, it is possible to change a mode field diameter of an optical waveguide which is formed in a pure silica glass 5 by changing a pulse width of femtosecond laser pulses which are focused in the pure silica glass plate 5 as shown in examples which are explained later.

In the present invention, the mode field of the optical waveguide is measured as follows. First, a light at the wavelength of 1550 nm is introduced to an optical waveguide which is formed in a transparent material such as a pure silica glass plate 5. Next, a near-field pattern of guided light is measured by a CCD camera. When an intensity of a light in the obtained near-field pattern is 1/e, such a width becomes a mode field diameter.

In addition, when the pulse width of femtosecond laser pulses are changed in a range of 210 to 560 fs, for example, a mode field diameter of the obtained optical waveguide changes in a range of 6 to 14 μm, and the mode field diameter of the obtained optical waveguide becomes maximum near a 320 fs pulse width. The mode field diameter changes slightly according to other parameters such as a repetition rate of femtosecond laser pulses, an average output power, and a center wavelength. Although, even if these parameters change, similar tendencies are indicated.

Also, if the pulse width is in a range of 210 to 490 fs, it is possible to control the mode field diameter in a range of 8 to 14 μm. Furthermore, if the pulse width is in a range of 210 to 420 fs, it is possible to control the mode field diameter in a range of 10 to 14 μm.

According to the first embodiment, it is possible to control a mode field diameter of an optical waveguide which is formed in a pure silica glass plate 5 at a desirable diameter by using focused femtosecond laser pulses. For example, it is possible to adapt the mode field diameter of the optical waveguide to a mode field diameter of a single mode fiber when the optical waveguide is connected to a single mode fiber; thus, it is possible to reduce the connection loss.

Second Embodiment

In a second embodiment, for example, an aspect ratio of a mode field diameter of an optical waveguide which is obtained is controlled by changing a peak power at the focal point of femtosecond laser pulses when femtosecond laser pulses are focused in a pure silica glass plate 5 by using a processing machine shown in FIG. 1.

It is possible to change the peak power at the focal point by changing an average output power of femtosecond laser pulses which are incident to a condenser 4. It is possible to change the average output power by selectively using an ND filter 2 according to its transmission ratio. It is also possible to change the average output by changing an output power of the femtosecond laser pulses in light source 1.

A peak power of femtosecond laser pulses at the focal point can be calculated with the following equations E1 to E3.

Diameter (m) of focal point=Difference between femtosecond laser pulses and a Gaussian distribution in a light intensity distribution×wavelength (m)÷neutral aperture of the condenser(E1).

Peak power (W) of femtosecond laser pulses just after the condenser=average output power (W) of femtosecond laser pulses after the condenser÷repetition rate (Hz)÷pulse width (s) (E2).

Peak power (W/m²) at the focal point=peak power (W) of femtosecond laser pulses just after the condenser÷focal point area (m²) (E3).

According to equation E1, the difference between femtosecond laser pulses and a Gaussian distribution in a light intensity distribution can be calculated by measuring an optical intensity of femtosecond laser pulses before femtosecond laser pulses are focused. According to equation E2, average output power of femtosecond laser pulses after the condenser can be determined by measuring the average output power with a power meter after femtosecond laser pulses are focused.

The rest of parameters can be determined by factors such as specification in a processing machine, which is used in the present embodiment.

As understood according to the examples which are explained later, the peak power of femtosecond laser pulses decreases at the focal point, an aspect ratio of the mode field diameter of an optical waveguide which is obtained, decreases accordingly so as to approach 1 (one). The aspect ratio of the mode field diameter becomes 1 (one) when the peak power is not greater than $8.7\times10^{11}$ W/cm², thus, the mode field is formed in a circular shape. Also, if the peak power is not smaller than $8.7\times10^{11}$ W/cm², the aspect ratio is greater than 1 (one); thus, the mode field is formed in an elliptical shape.

A mode field of an optical waveguide can be determined as follows. First, a light is introduced to an optical waveguide, which is formed in a transparent material such as a pure silica glass plate 5. Next, a near-field pattern of guided light is measured with a CCD camera. When an intensity of a light in the obtained near-field pattern becomes 1/e, such a width becomes a mode field diameter.

Consequently, under the condition that a direction in which femtosecond laser pulses are incident is a "height direction" of an optical waveguide, and a direction orthogonal to the height direction is a "width direction", a "mode field diameter in the height direction" and a "mode field diameter in the width direction" are determined according to a near-field pattern in the "height direction" and "width direction". In addition, a ratio of the "mode field diameter in the height direction" and the "mode field diameter in the width direction" is defined as an aspect ratio of the mode field diameter.

Therefore, when the aspect ratio is 1 (one), a mode field is formed in a circular shape. When the aspect ratio is greater than 1 (one), a mode field is formed in an elliptical shape.

According to a method for forming an optical waveguide according to the second embodiment, it is possible to control a shape of a mode field of an optical waveguide, which is obtained such as an aspect ratio of the mode field diameter by changing the peak power of femtosecond laser pulses at the focal point; thus, it is possible to form the mode field diameter selectively in a circular shape and an elliptical shape.

Furthermore, it is possible to form a circular mode field when the peak power is not greater than $7\times10^{11}$ W/cm², and it is possible to form an elliptical mode field when the peak power is greater than $7\times10^{11}$ W/cm².

Therefore, when an aspect ratio of the mode field diameter of an optical waveguide which is obtained is set to be 1 (one), it is possible to reduce the connection loss by forming a mode field in a circular shape because a shape of a mode field in an ordinary optical fiber is circular. Also, it is possible to form an optical waveguide having a circular mode field; thus, it is possible to reduce a polarization mode dispersion and a polarization dependent loss in such an optical waveguide.

Third Embodiment

According to a third embodiment, for example, when an optical waveguide is formed by focusing femtosecond laser pulses to a transparent material, such as a pure silica glass plate 5, by using a processing machine shown in FIG. 1, a pulse width of the femtosecond laser pulses are changed and a peak power at the focal point is also changed. By doing this, it is possible to change a mode field diameter of an optical waveguide, and simultaneously, to change an aspect ratio of the mode field diameter.

More specifically, it is preferable that the pulse widths of the femtosecond laser pulses are not greater than 490 fs and the peak power is not greater than $8.7\times10^{11}$ W/cm². By setting the above conditions, it is possible to form an optical waveguide having an 8 to 14 μm mode field diameter. More preferably, it is preferable that the pulse width of femtosecond laser pulses are not greater than 420 fs. By setting the above conditions, it is possible to form an optical waveguide having a 10 to 14 μm mode field diameter. More preferably, it is preferable that the pulse widths of the femtosecond laser pulses are not greater than 420 fs and a peak power is not greater than $8.7 \times 10^{11}$ W/cm². By setting the above conditions, it is possible to form an optical waveguide having a 10 to 14 μm mode field diameter, such that the mode field diameter has 1 (one) aspect ratio.

An optical waveguide according to the present invention is formed according to any one of three embodiments which relate to the above method for forming an optical waveguide. Therefore, in such an optical waveguide, it is possible to adjust a mode field diameter, to adjust an aspect ratio of the mode field diameter or a mode field diameter and an aspect ratio of the mode field diameter for the suitable value of required specification. In particular, when an optical waveguide is supposed to be connected with an ordinary single mode fiber, it is possible to form an optical waveguide having a 10 to 14 μm mode field diameter with 1 (one) aspect ratio; thus, it is possible to reduce a connection loss with the single mode fiber so that it is not greater than 0.3 dB.

Also, it is possible to form optical components such as planar light wave circuit devices, like an optical switch in which an optical waveguide is formed having an aspect ratio of a mode field diameter 1 (one) and circular shaped mode field; therefore, the polarization mode dispersion and polarization dependent loss are low. For example, the polarization dependent loss is not greater than 0.5 dB.

Hereinafter, examples of the present invention are shown as follows.

EXAMPLE 1

A processing machine shown in FIG. 1 is used, and femtosecond laser pulses having a 800 nm center wavelength and a 200 kHz repetition rate is oscillated by a light source of femtosecond laser pulses 1. A pulse width of the oscillated femtosecond laser pulses is changed in a range of 210 to 560 fs and is incident to a condenser 4 having a 0.5 numerical aperture. Oscillated femtosecond laser pulses are condensed and here and are incident to from a surface of a pure silica glass plate 5 having 1 mm thickness to 30 μm depth from the surface.

A three-dimensional precision stage 6 on which a pure silica glass plate 5 is mounted is moved in the X direction at 30 μm/s. By doing this, the position of a focal point is moved relatively; thus, an optical waveguide having a 25 mm length is formed.

A light at the wavelength of 1550 nm is introduced to an optical waveguide which is formed. A near-field pattern of guided light is measured by a CCD camera. A mode field diameter is calculated from the measured near field pattern.

Figure 2:
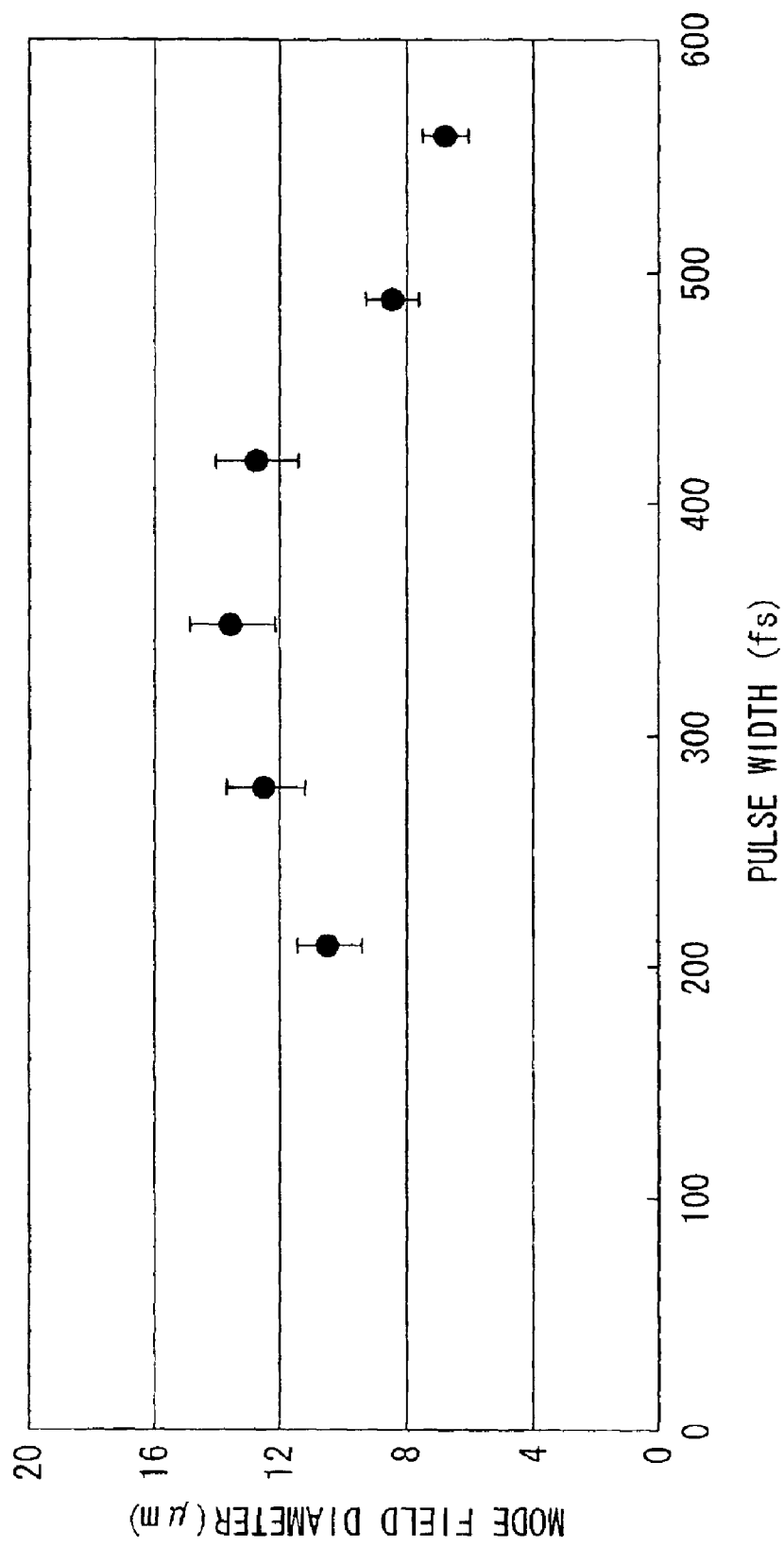
FIG. 2 is a view of an embodiment of the present invention.

In FIG. 2, a relationship between the pulse width and a mode field diameter is shown under condition that a mode field diameter changes according to a change in the pulse width.

Also, single mode fiber having 12 μm mode field at 1.5 is connected to input and output ports of the optical waveguide. A connection loss is measured under this condition.

A result is shown as a relationship between a pulse width and a connection loss in a TABLE 1.

TABLE 1

| Pulse Width (fs) | Connection Loss (dB) |
| --- | --- |
| 210 | 0.26 |
| 280 | 0.26 |
| 350 | 0.28 |
| 420 | 0.26 |
| 490 | 0.33 |
| 560 | 0.68 |

According to results shown in TABLE 1 and FIG. 2, it is understood that it is possible to form a mode field diameter in a range of 10 to 14 μm by forming a pulse width of femtosecond laser pulses in a range of 210 to 420 fs; thus, it is possible to reduce the connection loss so that it is not greater than 0.3 dB.

EXAMPLE 2

A processing machine shown in FIG. 1 is used, and femtosecond laser pulses having a 800 nm center wavelength and a 200 kHz repetition rate is oscillated by a light source comprising femtosecond laser pulses 1. ND filters 2 having various transmission rate are inserted in an optical path of a femtosecond laser light so as to attenuate an average output of the light source comprising femtosecond laser pulses. The attenuated femtosecond laser pulses are incident to a condenser 4 having a 0.5 numerical aperture. The oscillated femtosecond laser pulses are focused here and are incident to from a surface of a pure silica glass plate 5 having a 1 mm thickness to a 30 μm depth from the surface.

A three-dimensional precision stage 6, on which a pure silica glass plate 5 is mounted, is moved in the X direction at 30 μm/s. By doing this, the position of a focal point is relatively moved; thus, an optical waveguide having a 25 mm length is formed.

Also, an average output power of femtosecond laser pulses after the condenser 4 is measured by a power meter. An average output power of femtosecond laser pulses are shown in FIG. 2.

TABLE 2

| Average Output Power (mW) before A Condenser | Average Output Power (mW) after A Condenser | Peak Power (W/cm²) at a Focal Point |
| --- | --- | --- |
| 800 | 131 | $8.7 \times 10^{12}$ |
| 635 | 104 | $6.9 \times 10^{12}$ |
| 400 | 66 | $4.4 \times 10^{12}$ |
| 318 | 52 | $3.5 \times 10^{12}$ |
| 253 | 41 | $2.7 \times 10^{12}$ |
| 80 | 14 | $8.7 \times 10^{11}$ |

The above parameters are assigned in the above equations E1 to E3; thus, the peak power of the femtosecond laser pulses at a focal point is calculated.

First, a diameter at a focal point is calculated according to equation E1, a result is 1.5 μm. A difference between femtosecond laser pulses and a Gaussian distribution in an optical intensity distribution in equation E1 is calculated by measuring an optical intensity distribution of femtosecond laser pulses with a power meter before femtosecond laser pulses pass through the condenser.

Next, a peak power of femtosecond laser pulses before the femtosecond laser pulses are focused is calculated according to equation E2. For an average output power of femtosecond laser pulses after the femtosecond laser pulses pass the condenser, the figures shown in TABLE 1 are used. Finally, the peak power of the femtosecond laser pulses at the focal point is calculated according to equation E3. These figures are shown in TABLE 2.

By doing this, an optical waveguide is formed by adjusting an average output power of femtosecond laser pulses which are incident to a condenser 4. A measurement light at the wavelength of 1550 nm is introduced to the formed optical waveguide. An image of a near-field pattern of the measured guided light is taken by a CCD camera. A mode field diameter is calculated by the near-field pattern. Furthermore, an aspect ratio of the mode field diameter is calculated by the above mode field diameter.

Figure 3:
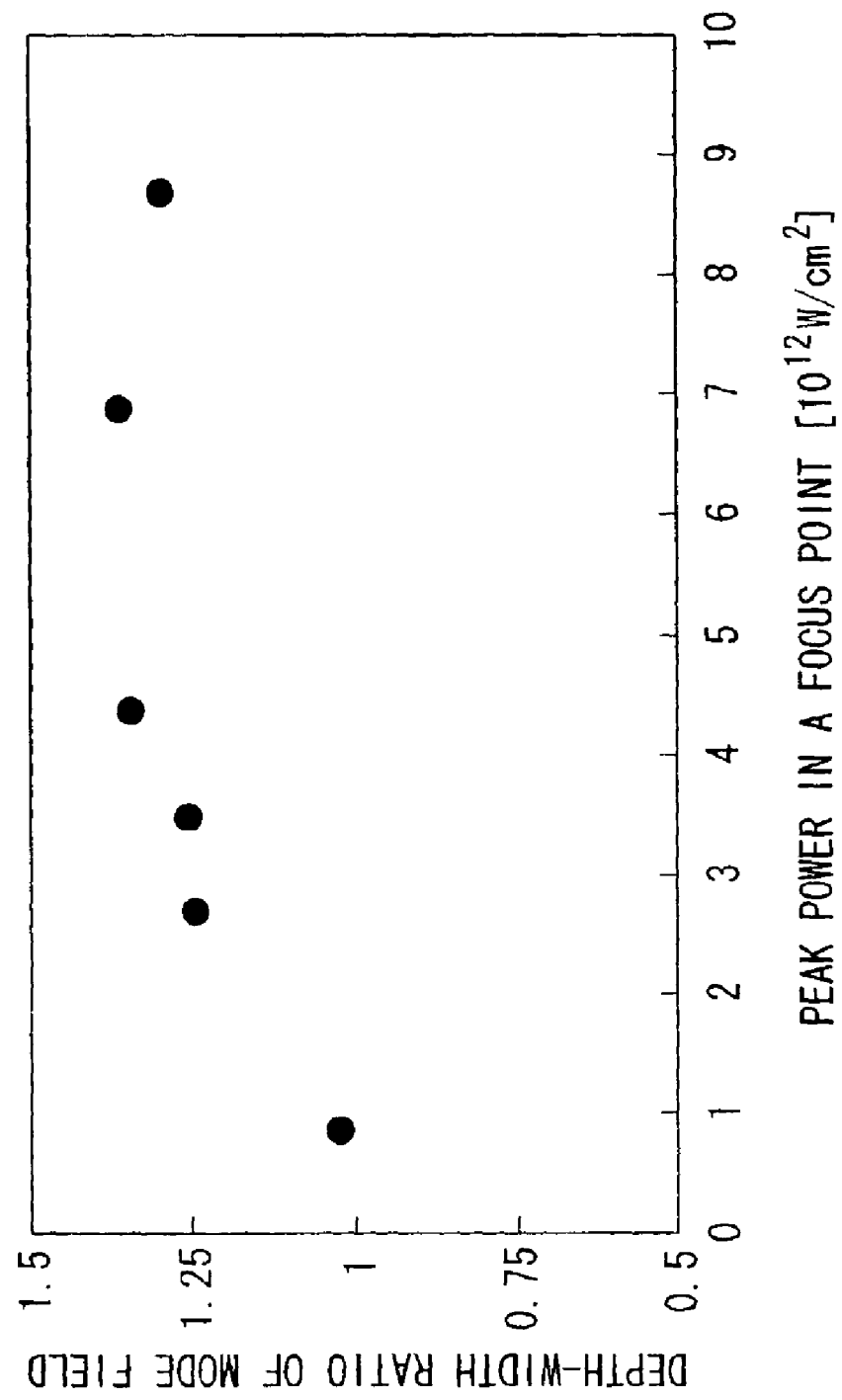
FIG. 3 is a view of another embodiment of the present invention.

Consequently, a relationship between the peak power of femtosecond laser pulses at the focal point, which is calculated by the above equations, and an aspect ratio of the mode field diameter, which is obtained by measuring the near-field pattern, is obtained. The relationship is shown in FIG. 3.

According to a graph shown in FIG. 3, it is understood as follows. First, there is a tendency in that an aspect ratio of the mode field diameter decreases as the peak power of the femtosecond laser pulses at the focal point decreases. The aspect ratio becomes approximately 1 (one) when the peak power is $8.7 \times 10^{11}$ W/cm$^2$; thus, a mode field is shaped in a circle.

Also, according to the graph, it is understood that it is possible to realize an elliptically-shaped mode field by setting the peak power to be greater than $8.7 \times 10^{11}$ W/cm$^2$. According to this, it is possible to form an optical waveguide having an elliptically-shaped mode field by setting the peak power to be greater than $8.7 \times 10^{11}$ W/cm$^2$.

It is commonly understood that ordinary plane light wave circuit devices cannot be used practically unless a polarization dependent loss is under 0.5 dB. It is commonly known that it is possible to reduce the polarization dependent loss to under 0.5 dB by setting the aspect ratio of the mode field diameter of an optical waveguide under 1.2. Therefore, according to a graph shown in FIG. 3, it can be understood that it is possible to set the aspect ratio of the mode field diameter in an optical waveguide under 1.2 by setting the peak power of the femtosecond laser pulses at the focal point under $5 \times 10^{12}$ W/cm$^2$.

A processing machine shown in FIG. 1 is used, and femtosecond laser pulses at the wavelength of a 800 nm of center wavelength, a 200 kHz repetition rate, and a pulse width in a range of 150 to 600 fs is oscillated by a light source comprising femtosecond laser pulses 1. ND filters 2 having various transmission rate are inserted in an optical path of femtosecond laser pulses to attenuate the average output power of the femtosecond laser pulses. Attenuated femtosecond laser pulses are incident to a condenser 4 having a 0.5 numerical aperture. Oscillated femtosecond laser pulses are focused here and are incident to form a surface of a pure silica glass plate 5 having a 1 mm thickness to a 30 µm depth from the surface.

A three-dimensional precision stage 6, on which a pure silica glass plate 5 is mounted, is moved in the X direction at 30 µm/s. By doing this, a position of a focal point is relatively moved; thus, an optical waveguide having a 25 mm length is formed.

Under such a condition, as shown in the above example 2, a peak power of femtosecond laser pulses at the focal point is changed in a range of $8.7 \times 10^{11}$ W/cm$^2$ to $8.7 \times 10^{12}$ W/cm$^2$.

By doing this, a pulse with of femtosecond laser pulses and a peak power of femtosecond laser pulses at the focal point are changed, and an aspect ratio of a mode field diameter of an optical waveguide is measured according to a similar method explained in the example 2. A result is shown in FIG. 4.

Figure 4:
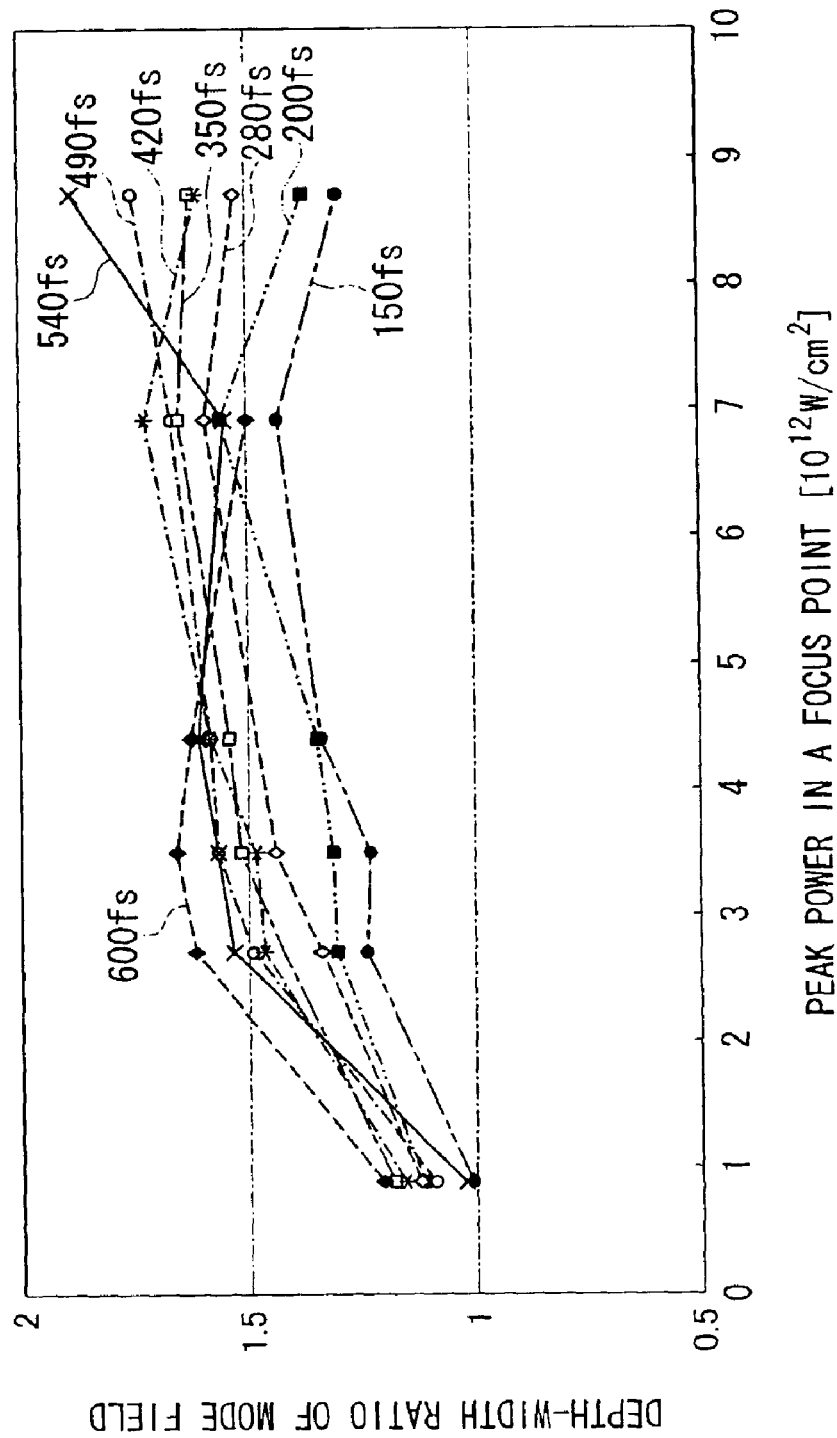
FIG. 4 is a view of another embodiment of the present invention.

According to a graph shown in FIG. 4, it shows that there is a tendency of the aspect ratio of a mode field diameter to increase as the peak power increases. Also, it shows that there is a tendency of the aspect ratio of the mode field diameter to increase as the pulse width increases. Also, it is understood that an aspect ratio fluctuates more greatly in an area in which a peak power is larger than in the other area according to the fluctuation of the pulse width.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of forming optical waveguide in the interior of a pure silica glass comprising:
   focusing femtosecond laser pulses on said glass to form a high refractive index region,
   wherein a mode field diameter of said optical waveguide is controlled by changing the pulse width of said femtosecond laser pulses;
   wherein the pulse width of said femtosecond laser pulses in a range of 210 to 420 fs; and
   the femtosecond laser pulses are condensed by a condenser having a numerical aperture of approximately 0.5.

2. A method of forming an optical waveguide according to claim 1 wherein the pulse width of said femtosecond laser pulses at the focal point is not greater than 420 fs.

3. A method of forming an optical waveguide in the interior of a pure silica glass comprising:
   focusing femtosecond laser pulses on said glass to form a high refractive index region,
   wherein an aspect ratio of the mode field diameter of said optical waveguide is controlled by changing the peak power of said femtosecond laser pulses at the focal point; and
   the femtosecond laser pulses are condensed by a condenser having a numerical aperture of approximately 0.5.

4. A method of forming an optical waveguide according to claim 3 wherein the peak power of said femtosecond laser pulses at the focal point is not greater than $8.7 \times 10^{11}$ W/cm$^2$.

5. A method of forming optical waveguide in the interior of a pure silica glass comprising:
   focusing femtosecond laser pulses to form a high refractive index region,
   wherein both a mode field diameter and an aspect ratio of the mode field diameter of said optical waveguide is controlled by changing both the pulse width of said femtosecond laser pulses and the peak power of said femtosecond laser pulses at the focal point; and
   the femtosecond laser pulses are condensed by a condenser having a numerical aperture of approximately 0.5.

6. A method of forming an optical waveguide according to claim 5 wherein the pulse width of said femtosecond laser pulses is not longer than 490 fs; and the peak power of said femtosecond laser pulses at the focal point is not greater than $8.7 \times 10^{11}$ W/cm$^2$.

7. A method of forming optical waveguide according to claim 5 wherein the pulse width of said femtosecond laser pulses are not longer than 420 fs; and the peak power of said femtosecond laser pulses at the focal point is not greater than $8.7 \times 10^{11}$ W/cm$^2$.

8. A method of forming an optical waveguide according to claim 5 wherein the pulse width of said femtosecond laser pulses is in range of 210 fs to 420 fs; and the peak power of said femtosecond laser pulses at the focal point is not greater than $8.7 \times 10^{11}$ W/cm$^2$.

9. An optical waveguide which is formed by using a method according to any one of claims 1 to 2 and 3 to 8.

10. An optical waveguide which is formed by using a method according to any one of claims 1 to 2 and 3 to 8 wherein:

a mode field diameter of said waveguide is in a range of 10 to 14 $\mu$m;

and an aspect ratio of the mode field diameter of said optical waveguide is in a range of 0.9 to 1.1.

11. An optical waveguide which is formed by using a method according to any one of claims 1 to 2 and 3 to 8 wherein:

the pure silica glass in which the waveguide is formed has a thickness of approximately 1 nm.

* * * * *